US008988216B2

(12) United States Patent
Bhogal et al.

(10) Patent No.: US 8,988,216 B2
(45) Date of Patent: Mar. 24, 2015

(54) AUDIO POSITIONING SYSTEM

(71) Applicant: International Business Machines Corporation, Armonk, NY (US)

(72) Inventors: Kulvir S. Bhogal, Fort Worth, TX (US); Lisa Seacat DeLuca, Baltimore, MD (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 13/853,215

(22) Filed: Mar. 29, 2013

(65) Prior Publication Data

US 2014/0292508 A1 Oct. 2, 2014

(51) Int. Cl.

| | |
|---|---|
| ***G01S 5/00*** | (2006.01) |
| ***G01S 5/02*** | (2010.01) |
| ***A61H 3/06*** | (2006.01) |

(52) U.S. Cl.

CPC .......................................... *A61H 3/06* (2013.01)
USPC .................. 340/539.13; 340/539.11; 342/451

(58) Field of Classification Search

CPC ..................................... G01S 5/00; G01S 5/02
USPC ............... 340/539.1, 539.11, 539.13, 539.32, 340/568.1, 571, 572.1, 573.1, 4.11, 10.1; 701/301, 426, 526; 700/91, 93; 342/350, 357.31, 451
See application file for complete search history.

(56) References Cited

U.S. PATENT DOCUMENTS

| | | | | |
|---|---|---|---|---|
| 7,199,725 | B2 | 4/2007 | Gilfix et al. | |
| 8,108,144 | B2 | 1/2012 | Forstall et al. | |
| 8,289,159 | B2 * | 10/2012 | Julian et al. | 340/539.32 |
| 8,712,690 | B1 * | 4/2014 | White et al. | 701/526 |
| 2005/0099291 | A1 | 5/2005 | Landau | |
| 2009/0032590 | A1 | 2/2009 | Hopkins | |
| 2012/0053826 | A1 * | 3/2012 | Slamka | 701/301 |
| 2012/0062357 | A1 * | 3/2012 | Slamka | 340/4.11 |
| 2013/0038490 | A1 * | 2/2013 | Garcia | 342/451 |

OTHER PUBLICATIONS

Brian Gane, et al.; "Helping viusally impaired people keep track of objects around their living space"; [SUC 8040; Dec. 8, 2005.
"Trekker Breeze handheld talking GPS"; Humanware; Copyright 2005-2013 HumanWare Group; Printed Mar. 1, 2013; <http://www.humanware.com/en-usa/products/blindness/talking_gps/trekker_breeze/_details/id_101/trekker_breeze_handheld_talking_gps.html>.

* cited by examiner

*Primary Examiner* — Van T. Trieu
(74) *Attorney, Agent, or Firm* — Nicholas Cadmus

(57) ABSTRACT

In a method for directing a user of a mobile computing device to an object, a mobile computing device determines an area in which a user of the mobile computing device is located. The mobile computing device determines a location of an object within the area, in relation to the user. The mobile computing device provides at least one audio tone to indicate at least the location of the object in relation to the user.

12 Claims, 4 Drawing Sheets

AUDIO POSITIONING SYSTEM

FIELD OF THE INVENTION

The present invention relates generally to the field of assistive devices for visually impaired individuals, and more particularly to directing a user of a mobile computing device to an object.

BACKGROUND OF THE INVENTION

Traveling in unfamiliar spaces is challenging for the visually impaired. Travelers who are visually impaired have varying levels of difficulty in finding or accurately orienting themselves to any given location. Visually impaired travelers may find it difficult to locate a particular building or street, and may find it particularly challenging to navigate one's way through an unfamiliar bounded location, such as a store or a park. A global positioning system (GPS) may help pinpoint a traveler's location, but does not effectively provide relational information of the traveler's surrounding space. A device can be used to identify particular objects having embedded identification tags, but can only do so when a reader is in close proximity to the particular object.

SUMMARY

Aspects of an embodiment of the present invention disclose a method, computer program product, and computing system for directing a user of a mobile computing device to an object. A mobile computing device determines an area in which a user of the mobile computing device is located. The mobile computing device determines a location of an object within the area, in relation to the user. The mobile computing device provides at least one audio tone to indicate at least the location of the object in relation to the user.

DETAILED DESCRIPTION

Figure 1:
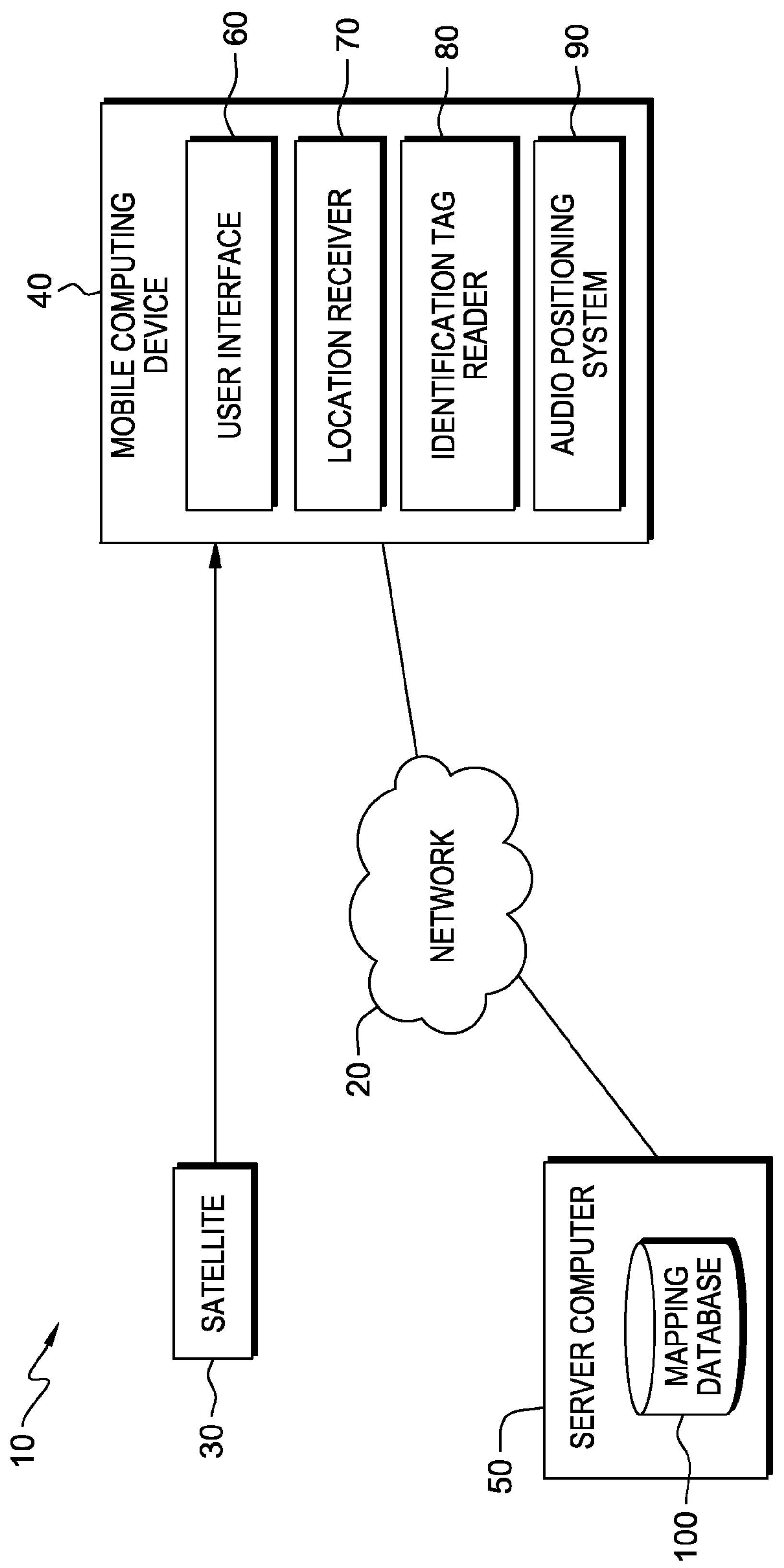
FIG. 1 is a functional block diagram illustrating a distributed data processing environment, including a server computer interconnected via a network with a mobile computing device, in accordance with an embodiment of the present invention.

Visually impaired individuals may determine their current location by using a Global Positioning System (GPS). Though this technology may assist a visually impaired individual during travel, the technology does not allow the user navigate to desired objects inside a smaller bounded area. An identification device may assist a visually impaired user in identifying objects that are embedded with identification tags; however, the device does not provide feedback about the distance of the location nor does the device navigate a route to the desired object.

Embodiments of the present invention identify and pinpoint objects within a bounded area (e.g., a park, a building) and provide audio tones to indicate existing objects and their relative locations to a user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 depicts a diagram of distributed data processing environment 10 in accordance with one embodiment of the present invention. FIG. 1 provides only an illustration of one embodiment and does not imply any limitations with regard to the environments in which different embodiments may be implemented.

Mobile computing device 40 is connected to server computer 50 over network 20. Network 20 may be a local area network (LAN), a wide area network (WAN) such as the Internet, a combination of the two or any combination of connections and protocols that will support communications between mobile computing device 40 and server computer 50 in accordance with embodiments of the invention. Network 20 may include wired, wireless, or fiber optic connections. Distributed data processing environment 10 may include additional server computers, client computers, or other devices not shown. Additionally, satellite 30 can communicate directly with mobile computing device 40 via radio frequency transmissions.

Mobile computing device 40 may be a smart phone, handheld Global Positioning System (GPS), tablet computer, or personal digital assistant (PDA). In general, mobile computing device 40 may be any electronic device or computing system capable of receiving positioning signals from one or more satellites 30, sending and receiving data, and communicating with server computer 50 over network 20. Mobile computing device 40 contains user interface 60, location receiver 70, identification tag reader 80, and audio positioning system 90.

Audio positioning system 90 may, in one embodiment, provide standard GPS functionality. For example, the user may use audio positioning system 90 to locate and travel to a department store. Audio positioning system 90 periodically requests a location of mobile computing device 40 from location receiver 70 as a route is traveled and a destination is reached. A route, as determined by audio positioning system 90, includes a series of coordinates from the initial location of mobile computing device 40 to the final destination and directions for the user to follow as the user travels from the initial location to the destination, such as directions for roads to follow, turns to make, etc.

In one embodiment, after a user arrives at his or her destination, the user may instruct audio positioning system 90, via user interface 60 to determine the positions of objects at the destination, such as the restroom, food court, etc. Audio positioning system 90 may access mapping database 100 over network 20. Mapping database 100 may contain, in one embodiment, information about accessibility friendly businesses. For example, mapping database 100 may contain blueprints for various locations such as building designs, store layouts, points of interest, identification tags (certain buildings provide path data to the visually impaired via identification tags—a layout may provide the information to where such paths may be intercepted/picked up), and socially tagged information from other parties who have visited the location. In one embodiment, subsequent to accessing a document describing the layout of the area, as mobile computing device 40 encounters various objects in the area, mobile computing device 40 may identify the object via embedded identification tags and update the layout with the identity of the object and location (based on current coordinate location of mobile computing device 40) of the object.

In one embodiment, the user selects a specific object or location from a list of identified objects or locations. In one embodiment, audio positioning system 90 reads the list to the user out loud. In another embodiment, audio positioning system 90 communicates the list to the user through a succession of tones, with each tone representing a type of object. Tones may also be used indicate distance and direction of a selected object. Audio tones used for any of the aforementioned features may be customizable. Examples are described further in the discussion of FIG. 2.

The following is an exemplary scenario of use of audio positioning system 90. A user is located in a store and uses audio positioning system 90 to select the restroom as the desired location. Audio positioning system 90 accesses mapping database 100 and determines the location of the nearest restroom in the store. Audio positioning system 90 determines a route from the current location of the user to the destination. Audio positioning system 90 facilitates navigation from the user's current location to the desired object through audio tones to guide the user to the object.

User interface (UI) 60 executes on mobile computing device 40. UI 60 operates to visualize content, such as menus and icons, and to allow a user to interact with an application accessible to mobile computing device 40. In one embodiment, a visually impaired user interacts with UI 60 by using screen reading software, such as Mobile Speak® software, voice control software, such as Nuance® Voice Control, a combination of screen reading and voice control software, or any other application that facilitates the use of mobile computing devices by users who are visually impaired. In one embodiment, UI 60 provides an interface to audio positioning system 90. For example, UI 60 may provide data received from audio positioning system 90 to the user.

In one embodiment, location receiver 70 receives positioning signals from one or more satellites 30. In one embodiment, an Application Programming Interface (API) (not shown) is provided for applications to call to receive the location of a location receiver. In one embodiment, location receiver 70 determines its location via a GPS system. In another embodiment, location receiver 70 determines its location via a cellular tower system, or any other approach, for example, including trilateration or triangulation may be used. A location receiver can determine its location and present that location as longitude and latitude coordinates. In one embodiment, based on the initial location of mobile computing device 40, individual user preferences, and a cartographic database (not shown), navigation program 80 determines a route to a destination inputted by a user for example at UI 60.

Identification tag reader 80 includes components configured to scan the environment for nearby identification tags. In one embodiment, identification tag reader 80 is configured to emit a carrier wave to include an RFID signal, or to emit such a RFID signal-bearing carrier wave at a predetermined, user-adjustable interval. For example, identification tag reader 80 can be configured to begin emitting an RFID signal when audio positioning system 90 is engaged and will continue to emit an RFID signal until audio positioning system 90 is disengaged. Therefore, one of ordinary skill in the art will recognize that embodiments of the invention do not require the user to press a button or otherwise manually activate a control each time he or she wishes to interrogate his or her environment for identification tags. In another embodiment, identification tag reader 80 is configured to receive carrier waves including RFID signals emitted by or reflected from active and passive/semi-passive environmental RFID tags, respectively. In another embodiment, identification tags are located using Bluetooth. In yet another embodiment, identification tags are located using near field communication.

In one embodiment, a decoder (not shown) is operatively coupled with identification tag reader 80 either by a wire or, in another embodiment, wirelessly. Identification tag reader 80 conveys an electrical signal to the decoder including data obtained from a carrier wave that was received by identification tag reader 80. When wirelessly coupled, each identification tag reader 80 and the decoder include a complementary one of a wireless signal transmitting means (e.g. transmitter, tag, etc.) or a wireless signal receiving means (e.g. antennae) to exchange a wireless signal between identification tag reader 80 and the decoder. The decoder interprets the data and derives information pertinent to object that the identification tag is embedded in.

Server computer 50 may be a management server, web server, or any other electronic device or computing system capable of receiving and sending data. In other embodiments, server computer 50 may represent a server computing system utilizing multiple computers as a server system, such as in a cloud computing environment. Server computer 50 contains mapping database 100.

Mapping database 100 is a database that may be written and read by audio positioning system 90. For example mapping database 100 may be a database such as an IBM® DB2® database or an Oracle® database. Though, in another embodiment, mapping database 100 may be located on another system or another computing device, provided that the source database is accessible to audio positioning system 90.

Figure 2:
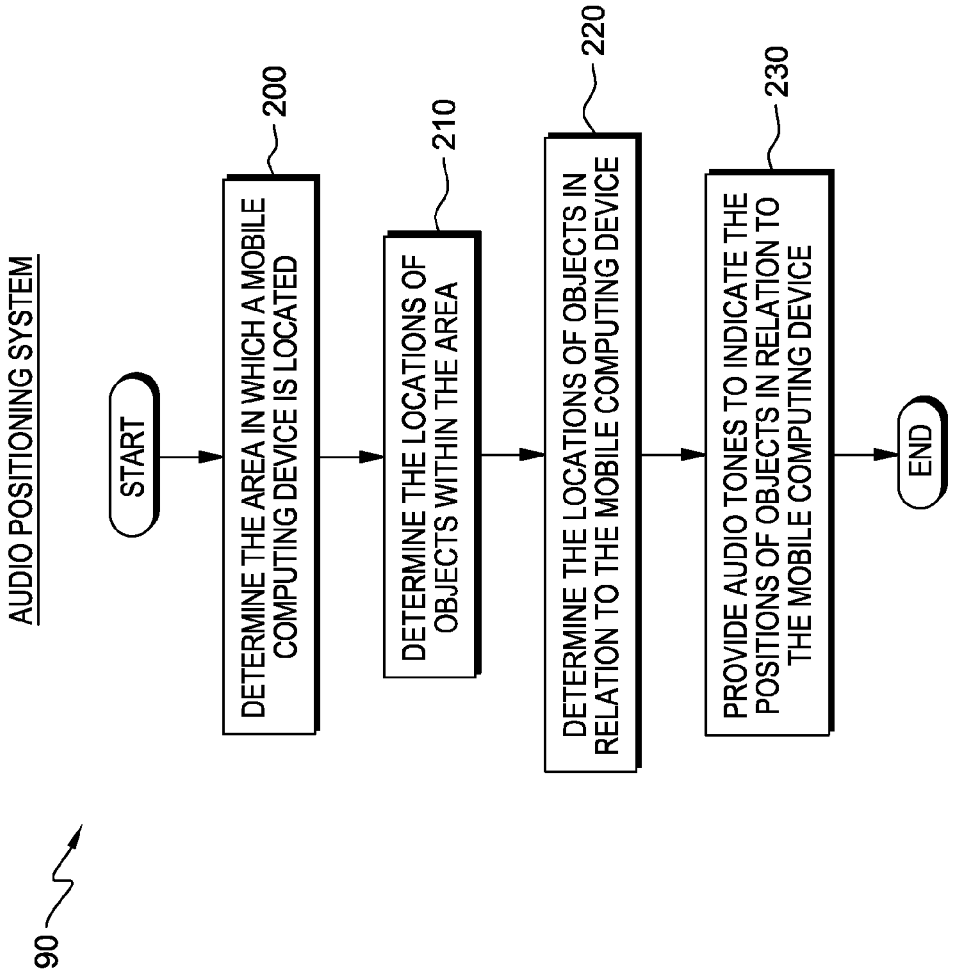
FIG. 2 is a flowchart depicting operational steps of an audio positioning system, executing within the mobile computing device of FIG. 1, for directing a user to the location of a desired object, in accordance with an embodiment of the present invention.

FIG. 2 is a flowchart of the steps of audio positioning system 90, on mobile computing device 40, for directing a user to the location of a desired object, in accordance with one embodiment of the present invention.

In step 200, audio positioning system 90 determines the area in which mobile computing device 40 is located. In one embodiment, audio positioning system 90 accesses location receiver 70, which receives positioning signals from one or more satellites 30. Audio positioning system 90 determines the geographic coordinates of mobile computing device 40 and locates the geographic coordinates on a digital map. Audio positioning system 90 identifies a bounded area in which the coordinates are located on the digital map. The bounded area is the surrounding area that is associated with a geographic coordinate and may include a building, a collection of buildings, an outdoor area (e.g. an amusement park), etc. For example, audio positioning system 90 determines that the geographic coordinates of mobile computing device 40 are geographic coordinates within a public park as described by the digital map. In another embodiment, the bounded area is determined by examining a radius around the geographic coordinates of mobile computing device 40 and identifying an area within the radius. In yet another embodiment, audio positioning system may identify an address nearest or corresponding to the coordinates and determine that the property represented by the address is the bounded area. Audio positioning system 90 may update the bounded area as the coordinates of mobile computing device 40 change. For example, as a user travels with mobile computing device 40, audio positioning system 90 periodically accesses location receiver 70, which receives updated positioning signals from one or more satellites 30. Audio positioning system 90 determines the new geographic coordinates of mobile computing device 40 and determines a new bounded area.

In a simplified embodiment of the present invention, various destinations (e.g. certain "smart" buildings) may have one or more identification tags installed around their property that identify the property (e.g., by address, name, etc.). For example, a business may have an installed identification tag at an entrance that can provide the business name and address. In such an embodiment, audio positioning system 90 determines the area in which mobile computing device 40 is located (e.g., a specific building) by reading the installed identification tag.

In step 210, audio positioning system 90 determines the locations of objects within the bounded area. In one embodiment, once the area in which mobile computing device 40 has been determined/identified, audio positioning system 90 accesses mapping database 100 via network 20. Audio positioning program 90 identifies the area to the mapping database, by providing one or more of: an address, a business name, a location name (e.g., "Hyde Park"), and one or more sets of coordinates. Based on the identified area, mapping database 100 may produce a corresponding map or document including a layout of objects located within the bounded area.

In another embodiment, identification tag reader 80 scans identification tags that are embedded in nearby objects within the bounded area. Audio positioning system 90 accesses identification tag reader 80 and compares the identities and locations of objects scanned by identification tag reader 80 to the identities and locations of objects described by the layout sent by mapping database 100. If audio positioning system 90 determines that an identity or location of an object identified by identification tag reader 80 differs from an identity or location of an object described by the layout sent by mapping database 100, audio positioning system 90 updates the layout. In one embodiment, audio positioning system 90 adds an identified object to the copy of the layout residing on mobile computing device 40 for future use. In another embodiment, audio positioning system 90 may send the new information to mapping database 100 so that future requests for the layout by any device retrieve the most up to date information. This has the advantage that, as more systems use and access mapping database, the accuracy of mapping database 100 continues to grow. In a similar vein, if mapping database 100 does not have any records corresponding to a sent area, and audio positioning system 90 locates identification tag embedded objects, audio positioning system 90 may create a layout based on the information it is able to retrieve, and update the mapping database with the layout.

In step 220, audio positioning system 90 determines the locations of objects in relation to the mobile computing device. Based on the user's determined coordinates, audio positioning system 90 can identify a location of the user within the layout. Distances and routes to objects within the layout, from the user's current location, can then be calculated. In one embodiment, audio positioning system 90 determines location of mobile computing device 40 by periodically accessing location receiver 70, which receives updated positioning signals from one or more satellites 30. Audio positioning system 90 then determines the location of each object by accessing mapping database 100 or a local copy of a layout receive from mapping database 100. Audio positioning system 90 determines the distances between mobile computing device 40 and each object. In one embodiment, audio positioning system 90 determines the direction in which an object is located in relation to mobile computing device 40. For example, audio positioning system 90 determines that the restroom is east of mobile computing device 40. In another embodiment, audio positioning system 90 determines the distance between an object and mobile computing device 40, as well as, the direction in which the object is located in relation to mobile computing device 40. For example, audio positioning system 90 determines that the restroom is located 20 meters east of mobile computing device 40.

In step 230, audio positioning system 90 provides audio tones to indicate the locations of objects in relation to the user. In one embodiment, the user sets up a configuration mapping priority of tones to receive depending on the identity of the objects available. For example, one specific tone is associated with information desks, and a different tone is associated with water fountains. The user selects each tone to represent a specific object and prioritizes each object. For example, the user configures audio positioning program 90 to provide a tone indicated the presence of an information desk first, water fountain second, etc. In another embodiment, the user uses tones that have been preselected by audio positioning program 90. For example, each tone represents a specific object and has been automatically selected by audio positioning program 90.

In one embodiment, the user programs audio positioning system 90 to provide tones in a specific order upon arriving at the location of each object. Audio positioning system 90 provides tones based on the priority of the tones selected by the user when he or she configured the tones. In one embodiment, delays are built in between providing tones to the user in order to avoid sensory overload. For example, when the user enters a restroom, audio positioning system 90 provides different tones in succession to identify and locate objects such as sinks, restroom stalls, receptacles, etc. in the order that the user selected when he or she configured the tones.

In another embodiment, the user programs audio positioning system 90 to provide tones only as the user encounters each object. For example, audio positioning system 90 provides a specific tone or tones as sinks and restroom stalls are each encountered, indicating their close proximity to the user.

In one embodiment, the user preselects only specific objects to be located by audio positioning system 90. For example, the user programs audio positioning system 90 to locate only the information desk and water fountains. Audio positioning system 90 only provides tones in succession that are specific to the information desk and water fountains to indicate the presence of each type of object within a museum as the user enters the museum.

In one embodiment, audio positioning system 90 provides tones to indicate the direction in which an object is located in relation to mobile computing device 40. For example, audio positioning system 90 provides tones to indicate that the restroom is to the left of mobile computing device 40. In yet another embodiment, audio positioning system 90 provides tones to indicate the distance between an object and mobile computing device 40, as well as, the direction in which the object is located in relation to mobile computing device 40. For example, audio positioning system 90 provides tones to indicate that the restroom is located 20 meters to the left of mobile computing device 40.

Figure 3:
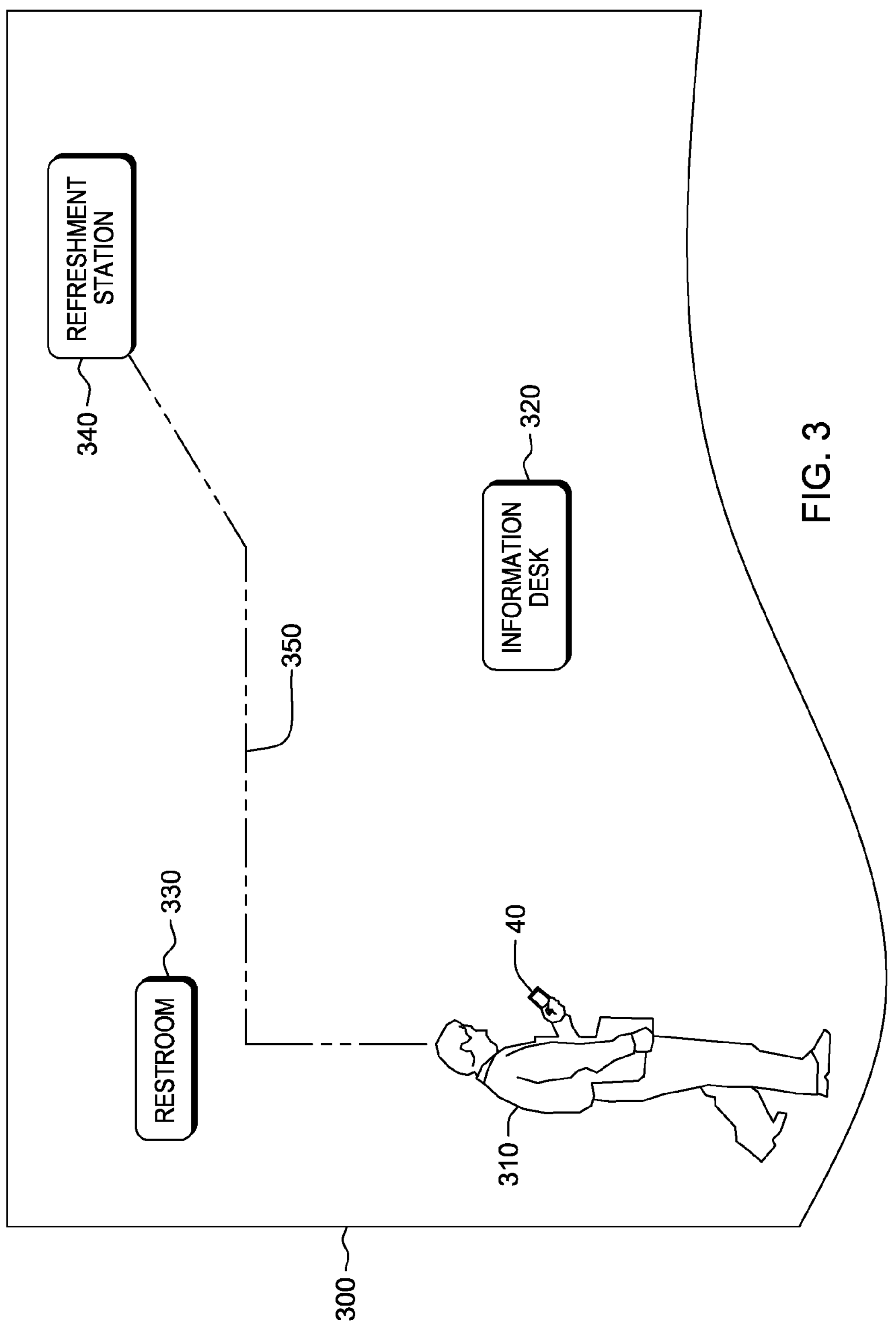
FIG. 3 depicts an exemplary environment in which the mobile computing device is running the audio positioning system, in accordance with one embodiment of the present invention.

FIG. 3 depicts an exemplary environment in which mobile computing device 40 is running audio positioning system 90, in accordance with one embodiment of the present invention. Park 300 is the bounded area in which mobile computing device 40 is located and being operated by user 310. Park 300 includes information desk 320, restroom 330, and refreshment station 340. In one embodiment, user 310 uses mobile computing device 40 to engage audio positioning system 90 (not shown). Audio positioning system 90 accesses location receiver 70 (not shown), which receives positioning signals from one or more satellites 30 (not shown). Audio positioning system 90 determines the geographic coordinates of mobile computing device 40 and locates the geographic coordinates on a digital map. Audio positioning system 90 identifies the bounded area in which the coordinates are located on the digital map as park 300. Audio positioning system 90 determines that mobile computing device 40 is located in park 300.

Audio positioning system 90 accesses mapping database 100 (not shown) over the network to determine the locations of objects within park 300. Based on the user's preselected settings, audio positioning system 90 provides audio tones to indicate the presence of nearby objects. The audio tones indicate the presence of restroom 330 and refreshment station 340. User 310 selects refreshment station 340 as a destination. Audio positioning system 90 determines the direction and distance to refreshment station 340 in relation to mobile computing device 40. Audio positioning system 90 provides audio tones to direct user 310 to refreshment station 340.

In one embodiment, one specific tone indicates the direction in which refreshment station 340 is located and a different tone to indicate the distance between mobile computing device 40 and refreshment station 340. For example, audio positioning system 90 provides periodic tones to assure user 310 that he or she is traveling in the correct direction and is approaching refreshment station 340. For example, when user 310 travels in a direction that is not toward refreshment station 340, audio positioning system 90 provides different tones to indicate that user 310 is traveling in the wrong direction and is now further from refreshment station 340. In yet another embodiment, audio positioning system 90 provides warning tones if user 310 approaches an object to prevent user 310 from colliding with an object. For example, if user 310 approaches information desk 320, which has not been identified as the desired object by user 310, audio positioning system 90 provides distinct tones to warn user 310 that he or she is approaching the wrong object. Audio positioning system 90 may also provide tones to identify the object that user 310 is approaching. Audio positioning system 90 provides additional tones to direct user 310 back onto the correct path toward refreshment station 340. Path 350 is the path audio positioning system 90 directs user 310 to travel in order to reach refreshment station 340.

Information desk 320 is an object that is not recognized by audio positioning system 90. Information desk 320 is a new addition to park 300 and is not included in the information stored by mapping database 100. As user 310 travels past information desk 320, mobile computing device 40, which contains identification tag reader 80 (not shown), reads the identification tag (not shown) that has been intelligently embedded in information desk 320. In one embodiment, audio positioning system 90 accesses the information read by identification tag reader 80 and sends the information pertaining to information desk 320 to mapping database 100 to be stored for future use. For example, audio positioning system 90 determines the location of information desk 320 and the type of object that information desk 320 is and sends the information to mapping database 100. Based on user 310's preselected settings, audio positioning system 90 provides audio tones indicating the presence of information desk 320. In one embodiment, user 310 selects information desk 320 as a new destination and audio positioning system 90 provides tones to direct user 310 to information desk 320.

Figure 4:
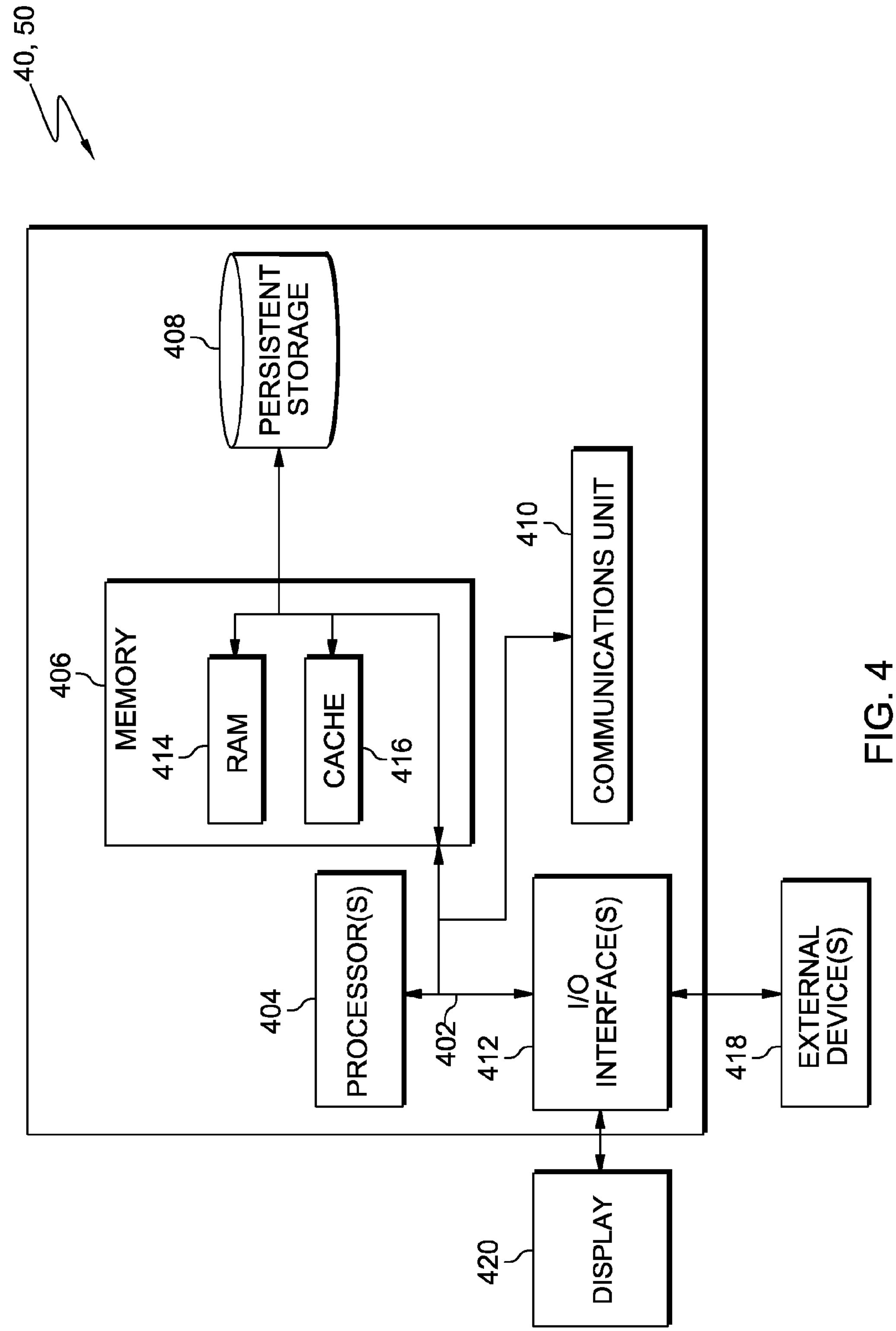
FIG. 4 depicts a block diagram of components of the mobile computing device executing the audio positioning system, in accordance with an embodiment of the present invention.

FIG. 4 depicts a block diagram of components of mobile computing device 40 and server computer 50, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Mobile computing device 40 and server computer 50 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

User interface 60, location receiver 70, identification tag reader 80, and audio positioning service 90 are stored in persistent storage 408 of mobile computing device 40 for execution by one or more of the respective computer processors 404 of user interface 60, location receiver 70, identification tag reader 80, and audio positioning service 90 via one or more memories of memory 406 of mobile computing device 40. Mapping database 100 is stored in persistent storage 408 of server computer 50 for execution by one or more of the respective computer processors 404 of server computer 50 via one or more memories of memory 406 of server computer 50. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other servers or devices. In these examples, communications unit 410 includes one or more network interface cards. Communications unit 410 may provide communications through the use of either or both physical and wireless communications links. Audio positioning service 90 may be downloaded to persistent storage 408 of mobile computing device 40, respectively, through the respective communications unit 410 of audio positioning service 90. Mapping database 100 may be downloaded to persistent storage 408 of server computer 50 through communications unit 410 of server computer 50.

I/O interface(s) 412 allows for input and output of data with other devices that may be connected to mobile computing device 40 or server computer 50. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., audio positioning service 90, can be stored on such portable computer-readable storage media and can be loaded onto persistent storage 408 of mobile computing device 40, respectively, via the respective I/O interface(s) 412 of mobile computing device 40. Software and data used to practice embodiments of the present invention, e.g., mapping database 100, can be stored on such portable computer-readable storage media and can be loaded onto persistent storage 408 of server computer 50 via I/O interface(s) 412 of server computer 50. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for directing a user of a mobile computing device to an object, the method comprising the steps of:

a mobile computing device determining a bounded area in which a user of the mobile computing device is located;

the mobile computing device, based on the determined bounded area, retrieving a document describing a layout of the determined bounded area, including locations of a plurality of known objects within the determined bounded area;

the mobile computing device identifying a location of a first object of the plurality of known objects within the determined bounded area and comparing the location of the first object to a location of the mobile computing device within the determined bounded area;

the mobile computing device, based on the layout of the determined bounded area, determining one or more other objects of the plurality of known objects between the location of the mobile computing device and the location of the first object;

the mobile computing device creating a path to the location of the first object that avoids the one or more other objects;

the mobile computing device directing the user of the mobile computing device to the location of the first object with audio tones;

the mobile computing device identifying a location of a second object along the path to the location of the first object, wherein the second object is not included in the plurality of known objects; and the mobile computing device causing the document describing the layout of the determined bounded area to be updated to include the location of the second object.

2. The method of claim 1, wherein the mobile computing device provides a user interface providing options to the user to select customizable audio feedback to indicate at least the location of the first object in relation to the user.

3. The method of claim 1, wherein the step of determining the bounded area in which the user of the mobile device is located comprises determining geographic coordinates and, based on the geographic coordinates, identifying a corresponding bounded area.

4. The method of claim 3, wherein the step of determining the bounded area in which the user is located comprises:

determining geographic coordinates of the mobile computing device using trilateration;

locating the geographic coordinates on a digital map; and identifying, on the digital map, a bounded area in which the coordinates are located.

5. A computer program product for directing a user of a mobile computing device to an object, the computer program product comprising:

one or more computer-readable storage media and program instructions stored on the one or more computer-readable storage media, the program instructions comprising:

program instructions to determine a bounded area in which a user of the mobile computing device is located;

program instructions to, based on the determined bounded area, retrieve a document describing a layout of the determined bounded area, including locations of a plurality of known objects within the determined bounded area;

program instructions to identify a location of a first object of the plurality of known objects within the determined bounded area and compare the location of the first object to a location of the mobile computing device within the determined bounded area;

program instructions to, based on the layout of the determined bounded area, determine one or more other objects of the plurality of known objects between the location of the mobile computing device and the location of the first object;

program instructions to create a path to the location of the first object that avoids the one or more other objects;

program instructions to direct the user of the mobile computing device to the location of the first object with audio tones;

program instructions to identify a location of a second object along the path to the location of the first object, wherein the second object is not included in the plurality of known objects; and program instructions to cause the document describing the layout of the determined bounded area to be updated to include the location of the second object.

6. The computer program product of claim 5, wherein the mobile computing device provides a user interface providing options to the user to select customizable audio feedback to indicate at least the location of the first object in relation to the user.

7. The computer program product of claim 5, wherein program instructions to determine the bounded area in which the user of the mobile device is located comprises program instructions to determine geographic coordinates and, based on the geographic coordinates, identifying a corresponding bounded area.

8. The computer program product of claim 7, wherein the program instructions to determine the bounded area in which the user is located comprises:

program instructions to determine geographic coordinates of the mobile computing device using trilateration;

program instructions to locate the geographic coordinates on a digital map; and program instructions to identify, on the digital map, a bounded area in which the coordinates are located.

9. A computer system for directing a user of a mobile computing device to an object, the computer system comprising:

one or more computer processors;

one or more computer-readable storage media;

program instructions stored on the computer-readable storage media for execution by at least one of the one or more processors, the program instructions comprising:

program instructions to determine a bounded area in which a user of the mobile computing device is located;

program instructions to, based on the determined bounded area, retrieve a document describing a layout of the determined bounded area, including locations of a plurality of known objects within the determined bounded area;

program instructions to identify a location of a first object of the plurality of known objects within the determined bounded area and compare the location of the first object to a location of the mobile computing device within the determined bounded area;

program instructions to, based on the layout of the determined bounded area, determine one or more other objects of the plurality of known objects between the location of the mobile computing device and the location of the first object;

program instructions to create a path to the location of the first object that avoids the one or more other objects;

program instructions to direct the user of the mobile computing device to the location of the first object with audio tones;

program instructions to identify a location of a second object along the path to the location of the first object, wherein the second object is not included in the plurality of known objects; and program instructions to cause the document describing the layout of the determined bounded area to be updated to include the location of the second object, program instructions to provide at least one audio tone to indicate at least the location of the object in relation to the user.

10. The computer system of claim 9, wherein the mobile computing device provides a user interface providing options to the user to select customizable audio feedback to indicate at least the location of the first object in relation to the user.

11. The computer system of claim 9, wherein program instructions to determine the bounded area in which the user of the mobile device is located comprises program instructions to determine geographic coordinates and, based on the geographic coordinates, identifying a corresponding bounded area.

12. The computer system of claim 11, wherein the program instructions to determine the bounded area in which the user is located comprises:

program instructions to determine geographic coordinates of the mobile computing device using trilateration;

program instructions to locate the geographic coordinates on a digital map; and program instructions to identify, on the digital map, a bounded area in which the coordinates are located.

* * * * *